Sept. 2, 1941.  C. L. EKSERGIAN  2,255,024

BRAKE ELEMENT

Filed Feb. 28, 1940

INVENTOR
Carolus L. Eksergian
BY John P. Barbro
ATTORNEY

Patented Sept. 2, 1941

2,255,024

UNITED STATES PATENT OFFICE 2,255,024

BRAKE ELEMENT

Carolus L. Eksergian, Detroit, Mich., assignor to Budd Wheel Company, Philadelphia, Pa., a corporation of Pennsylvania Application February 28, 1940, Serial No. 321,189

3 Claims. (Cl. 188—218)

The present invention relates to brakes.

More specifically, it relates to brakes of the so-called disc type, wherein a ring or disc carried by a rotating member serves as a brake element, suitable brake shoes being applied against one or both of the sides or faces of the said element.

Heretofore such elements have usually been made of cast metal, particularly cast iron, and this had several disadvantages, the chief one being that cast iron has a relatively low heat-conductivity so that upon emergency application of the brakes, the brake element would become unduly hot through failure to conduct the heat away rapidly enough from the faces of the brake element.

A secondary disadvantage of such brake elements made entirely of cast iron is that the surfaces, against which the brake shoes are forced, are sometimes injured by the high local heating, resulting in cracking, pitting or other superficial disintegration.

Cast iron is among the best materials for such friction surfaces, and therefore the present invention contemplates retaining such cast iron braking surfaces but applying them to supports made of other materials having suitable heat conductivity, combined with the necessary strength and toughness. This is accomplished by making the body portion of the brake element of a suitable light metal such as aluminum or an alloy thereof, with cast iron facings securely attached to its faces and in intimate heat-conducting relationship thereto.

Aluminum and its alloys however are usually relatively soft, and therefore the invention further contemplates providing ferrules of steel or cast iron in the aluminum body, to provide suitable linings for the bolt-receiving openings near the central part of the brake element, so that the stresses encountered in service will not distort or destroy said element where it is attached to the rotating element which is to be braked.

Considering the invention as a whole therefore, it consists of an aluminum or similar ring or disc having two annular rims or rings, attached to one another at intervals by braces or cross members, said cross members being secured at their inner ends to a flange portion provided with bolt holes having reinforcing bushings embedded therein, the annular rims having cast iron facings secured thereto on their outer sides and being provided with cooling vanes on their inner faces, preferably cast integrally therewith.

The invention will be clearly understood from the present specification and the drawing accompanying the same and forming a part thereof, wherein a preferred form of the invention and several modifications thereof are disclosed.

In said drawing.

In all the figures, similar elements are designated by corresponding reference characters.

Figure 1:
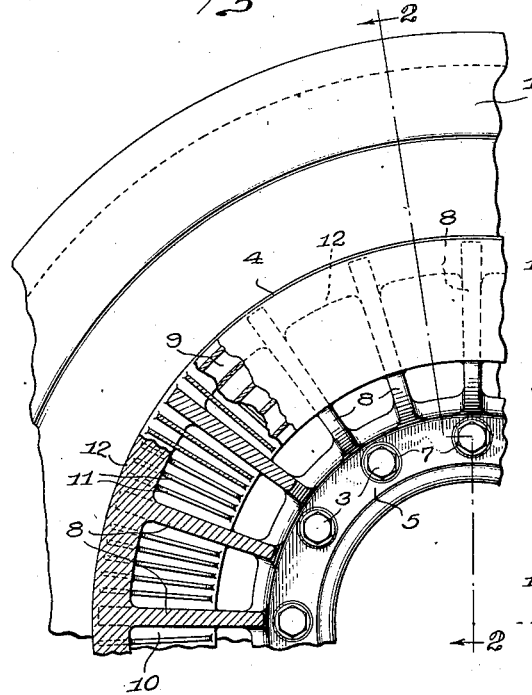
Fig. 1 is a diagrammatic fragmentary elevation, partly in section, showing certain details of the structure of the composite brake element.
Figure 2:
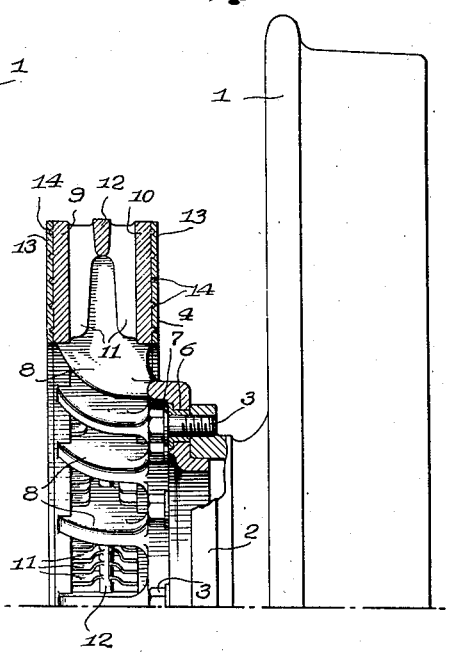
Fig. 2 is a diagrammatic end elevation corresponding to Fig. 1, and partly in section on the planes indicated by the broken line 2—2 of Fig. 1.

Referring first to the form disclosed in Figures 1 and 2, the brake element is shown as applied to a car wheel 1. As shown, the hub of the wheel has a flange 2 which is threaded to receive suitable cap screws 3, which serve to secure the brake element 4 to the said wheel. The brake element 4 may have a central disc-like bolting-on flange 5, cooperating with the said hub flange 2, and bushings or ferrules 6 of hard metal such as iron or steel may be embedded in said flange 5 as shown, said bushings being secured to the aluminum flange 5 in any preferred way, as by casting the aluminum around them or by forcing the bushings into the aluminum. Lockwashers 7 will preferably be provided under the heads of the cap screws 3, to prevent loosening of the same.

Cross members or spoke-like arms 8 extend laterally or axially from the outer edge of the flange 5 and also radially outward. The two annular rims or rings 9 and 10 are connected integrally by the outer ends of said cross members 8, thus providing a very rigid structure having large radial air passages, each such passage being defined by the two annular members 9 and 10 and an adjacent pair of braces 8. When the brake element rotates, the members 8 will act as vanes of a centrifugal blower, producing radial currents of cooling air, which will assist in dissipating the heat produced during braking.

In order to increase the cooling effect still further, ribs or vanes 11 may be formed on the inner surfaces of the rings 9 and 10, as by casting them integrally with said rings, and in order to strengthen the entire structure a third ring 12 midway between the rings 9 and 10 may also be provided, and cast integrally with the remaining portions of the aluminum or alloy casting.

The facings 13 attached to the outer surfaces of the rings 9 and 10 are preferably made of cast iron, and are relatively thin, to facilitate the transfer of heat from the braking surfaces to the aluminum casting. In order to secure the facings 13 to the aluminum, they may be provided with preferably roughened grooves, such as are shown at 14, into which the aluminum or other alloy will flow during the casting operation.

Figure 3:
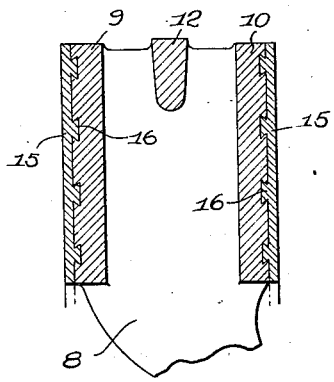
Fig. 3 is a diagrammatic cross section through a portion of the rim of a modified form of brake element, on an enlarged scale.

Referring now to the modified form illustrated in Fig. 3, here the facings 15 of cast iron are provided with annular dove-tails 16, projecting from their inner surfaces, which will provide a secure interlocking with the body of the aluminum member when said aluminum is cast in a mold within which the facings 15 have previously been placed properly.

Figure 4:
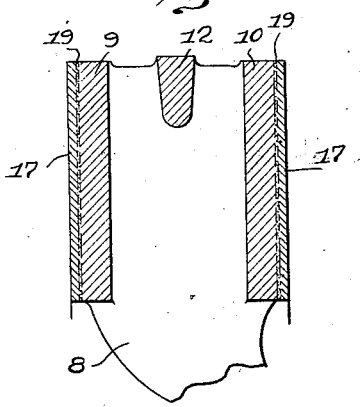
Fig. 4 is a similar cross section of a still further modification.

A still further modification is disclosed in Fig. 4. In this form, the cast iron facings 17 are secured to the outer faces of the rings 9 and 10 by providing an intermediate layer 19 of transition metal, such as zinc, copper, or suitable alloys of these metals, which will alloy or bond satisfactorily with both the aluminum and the facing metal.

This may be done, for example, by applying a coating of metal to the inner face of each cast iron member 17 in any known way, as by dipping the iron in a bath of molten metal after suitably cleaning and fluxing the iron surface, or by electro-plating the transition metal to the iron, or by spraying it thereon, as in the well-known "Shoop" process etc., a suitable metal being selected which will fuse superficially when the hot aluminum strikes it, and will thus alloy or bond with the said aluminum.

The operation of the invention will be obvious from the description of the structure, and may be summarized briefly as follows:

When heat is produced at the surfaces of the facings 13, 15, or 17, upon application of the brake shoes against the sides of the brake element 4, said heat will in part travel inwardly through the aluminum rings 9 and 10, and will then be dissipated by the radial air currents impinging on the braces 8 and vanes 11.

By reason of the intimate nature of the union between the aluminum and the iron, the heat transfer will be greatly facilitated, and this will be particularly true in the Fig. 4 form, because of the exceptionally good bonding provided by the transition metal, which incidentally also provides a strong mechanical joint between the iron and the aluminum or other alloy core to which it is applied.

While several embodiments of the invention have been disclosed in the present specification, it should be understood clearly that these embodiments are given merely as illustrations and not in any sense as limitations of the invention, which may of course be embodied in many other forms, if preferred.

For an understanding of the scope of the invention, attention is directed therefore solely to the following claims.

I claim:

1. A brake element consisting of an annular support having a central disc-like bolting-on flange, radial spoke-like arms extending from said flange and axially offset for the most part from the plane of said flange, said spoke-like arms widening from their connection to the flange toward their radially outer ends, and spaced rings secured to the opposite sides of the outer ends of said arms, said support being an integral casting of a relatively light metal having high heat conductivity, and relatively thin facings of a metal more suitable for a braking surface, but having a lower heat conductivity than said support and intimately bonded to the outer sides of said spaced rings.

2. A brake element according to claim 1, in which the metal of the support is an aluminous metal and the metal of the facings is cast iron.

3. A brake element according to claim 1, in which the bolting-on flange is locally reinforced by a metal of greater strength and hardness than the metal forming the body of the support.

CAROLUS L. EKSERGIAN.